United States Patent [19]

Emmons

[11] Patent Number: 4,592,941

[45] Date of Patent: Jun. 3, 1986

[54] REINFORCED LAMINATE OF CO-EXTRUDED FILM

[75] Inventor: Keith Emmons, Houston, Tex.

[73] Assignee: Reef Industries, Inc., Houston, Tex.

[21] Appl. No.: 707,429

[22] Filed: Mar. 1, 1985

[51] Int. Cl.⁴ .............................................. B32B 5/12
[52] U.S. Cl. .................................... 428/113; 428/247;
428/252; 428/292; 428/297; 428/500
[58] Field of Search ............... 428/252, 255, 247, 297,
428/113, 292, 500

[56] References Cited

U.S. PATENT DOCUMENTS

| | | | |
|---|---|---|---|
| 2,999,041 | 9/1961 | Lappala | 428/101 |
| 3,001,239 | 9/1961 | Noberasco | 428/247 |
| 3,214,320 | 10/1965 | Lappala et al. | 428/134 |
| 3,616,130 | 9/1967 | Rogosch et al. | 428/292 |

Primary Examiner—John E. Kittle
Assistant Examiner—Thomas C. Saitta
Attorney, Agent, or Firm—Vaden, Eickenroht, Thompson & Jamison

[57] ABSTRACT

A durable, high strength, lightweight film laminate of two layers of three-ply film with a nonwoven filament for reinforcement and permanently flexible adhesive between the film layers. The nonwoven filament is in a reinforced laminate and is an excellent protective covering and packaging material because of its resistance to weather elements, tears and punctures.

12 Claims, 4 Drawing Figures

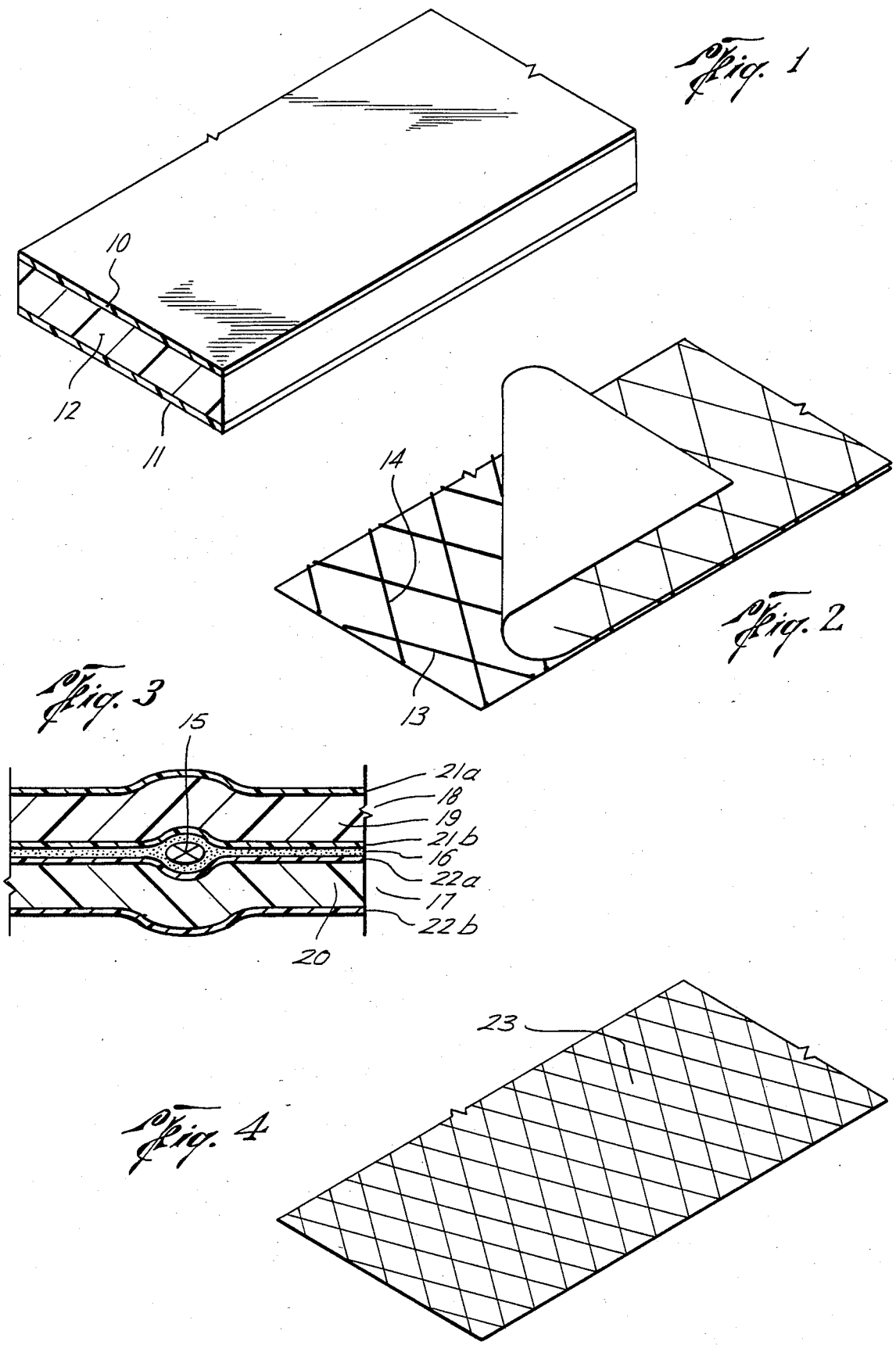

REINFORCED LAMINATE OF CO-EXTRUDED FILM

This invention is a laminate material of tri-extruded three-layer film. The three-ply film gives the final laminate material of unusual strength. The middle layer of the film is a combination of the olefins, linear low density polyethylene, high density polyethylene, propylene and ethylene-propylene-diene rubber. The two outer layers of the three-ply film are of linear low density polyethylene and an effective amount of ultraviolet light stabilizer. Two thicknesses of the three-layer film are coated on one side each with a pressure sensitive, flexible adhesive. On one thickness of film which has been coated with the adhesive a diamond pattern grid of nonwoven filament is laid so that it covers the entire area of the finished laminate. The diamond grid is formed by laying the fibers at about a 45° angle to either side of the machine axis of the film so that a crisscrossed pattern is in the film laminate. The two films are then contacted together on the adhesive coated side with the nonwoven yarn in a diamond pattern in between. The material is then rolled and forms the reinforced laminate. The resultant reinforced laminate is a very tough, tear and puncture resistant material with the adhesive and reinforcing nonwoven filament or yarn between the two thickness three-layer film. The three layers of the film are not readily discernible upon an unaided visual inspection although the diamond grid of nonwoven yarn is apparent. The inner layer can also include color additives depending on the preference of the user for particular application.

In addition to the tear and puncture resistance, this material is lightweight and easy to handle as protective covering for large equipment and storage or shipping of bulky items. It can be manufactured into bags or tubes with heat-sealed seams which are as strong as the material. The bags can be used for heavy or hard to handle items such as spikes or ball bearings.

Another object of the invention is to provide a storage or packaging material which is a superior vapor barrier. The material performs as an outdoor covering in the environmental elements for at least 30 months.

Another object of the invention is to provide a superior laminate with a fire retardant additive in the construction of the material.

A further objective of the invention is to provide an unusually strong polymer laminate material which can be fabricated easily for many shapes, sizes and colors and which can be varied to increase stiffness, toughness and strength properties.

FIG. 1 is an enlarged cross-section view of one thickness of the three-layer film.

FIG. 2 is a view of the laminate with the upper layer of film peeled back to show the reinforcement filament webbing.

FIG. 3 is an enlarged cross-section through a filament showing the layers of the laminate.

FIG. 4 is a view of a sheet of the material and the diamond pattern of the filament.

In the packaging and storage industry various density and thickness of polymer film of polyethylene, polyvinyl chloride, polypropylene and other polymers have been used. These materials are lightweight, easy to handle, but have the drawback that once punctured or torn have a tendency to continue to rip and increase the tear. To remedy the problem with tearing reinforced polymer films were developed. These materials provide high tear and impact strength and low water vapor permeability and include the non-tacky tear resistant material shown in U.S. Pat. No. 3,214,320 and marketed by the Applicant under the trademark Griffolyn ®. Companies other than the Applicant are marketing reinforced single-ply material such as Maka, a product of Max Katz Bag Company and Polyscrim, a product of Poly Plastics Design Corporation. This material is similar to the present invention with the significant exception of not having the three-ply co-extruded film used with the nonwoven grid. The earlier reinforced products used films of polymers such as polyethylene, polyvinylchloride, or others. The laminae on either side of the grid or web could be varied as to thickness or type of polymer, but the laminae were of a single-ply construction. Although the two-layer laminate with the nonwoven web was more effective in preventing or minimizing tearing than a non-reinforced single-ply film, these materials do not possess the strength characteristics of the present invention of two-layers of reinforced three-ply film.

The film from which the laminate is made is a three-layer or three-ply film. The film has been prepared as a tri-extruded blown film in the preferred embodiment, but could be manufactured by alternative methods which follow the same guidelines of components described herein. The three-layer co-extruded film contributes to the significant strength and toughness characteristics which, when compared with other reinforced laminates, is superior in tear tests, outdoor weathering, tensile strength and other significant characteristics for polymer products.

The film has a middle layer of a mixture of polyolefins. The composition of the middle layer is of the following olefins in approximate percentage of weight with respect to the total weight of the middle layer which include linear low density polyethylene from about 10% to about 25%, high density polyethylene from about 14% to about 35%, polypropylene from about 20% to about 50% and ethylene-propylene-diene rubber from about 5% to about 15%. The content of the middle layer can be varied for the end use desired. The high density polyethylene can be increased to increase stiffness of the product to maintain a shape. Other components can be varied to achieve desired tensile strength. The middle layer can contain other additives for desired product use. The middle layer can contain a color additive in effective amounts. The color additive is generally a coloring agent highly concentrated in one of the polyolefins components of the middle layer. Also, the fire retardant agent may be included in the middle layer. An ultraviolet stabilizer may also be included in the middle layer in some cases although it is generally added to the outer layers.

The layer on either side of the middle layer is a linear low density polyethylene generally with an effective amount of ultraviolet stabilizer. The low density polyethylene is amenable to heat sealing which is necessary for fabrication purposes. Also, the low density polyethylene has a good surface appearance. In FIG. 1 there is an enlarged cross section of the three-ply, tri-extruded film of one embodiment prior to lamination. The layers 10 and 11 are the linear low density polyethylene layers with middle layer 12 as the combination polyethylene, polypropylene, ethylene-propylene-diene layer. The layers of linear low density polyethylene need to be thick enough to provide an effective heat sealing layer for the film. The range of weight of outer layers of low density polyethylene to total weight starts at about 5% per outer layer for effective heat sealing capabilities. As the thickness of the outer layers 10 and 11 are increased relative to the middle layer 12 there is a decrease in the toughness, strength and stiffness contributed by the middle layer of the film. In the embodiment shown in FIG. 1 the outer layers 10 and 11 comprise about 10% each of the total thickness while the middle layer 12 is about 80%. The 10% outer layers give good heat seal qualities and the middle layer of about 80% gives the strength, toughness and stiffness qualities.

The actual thickness of the film can be varied depending on the usage desired. FIG. 1 is to show the relative thickness of the three layers and is not intended to indicate a particular scale of size. The thickness is relative to the strength, toughness and stiffness required as compared to the weight desired. A thicker, heavier film will be tougher, stronger and stiffer. A 2.0 mil thick film has shown the desired qualities when used in the laminate and yet has a low weight so that the material is easy to handle. The upper level of the film thickness would be limited by weight, handling characteristics and manufacturing capability. The usual applications would be in the 2.0–4.0 mil range for the three-ply film. The thickness of the outer layers of linear low density polyethylene should total about 0.5 mil which is required for adequate material for heat sealing.

In fabricating the laminate two thicknesses of the three-layer film are coated on one side with a pressure sensitive, flexible adhesive. The adhesive should be used in an effective amount to prevent delamination. The filaments are laid in a diamond pattern on one thickness of film that has been coated with the adhesive. The filaments are laid down in two sets of parallel rows of about a 45° angle to either side of the longitudinal axis of the machine. The parallel rows intersect at about 90° angles to give the diamond grid pattern. The fibers are not interwoven and can be laid on top of each other. In FIG. 2 a closer cross section of the final material is shown with one thickness of film peeled back to clearly see the grid. As shown in FIG. 2, filaments 13 and 14 are laid one on top of another and do not interlock or interweave with each other in the other strands shown in FIG. 2. After the nonwoven filaments are laid on an adhesive coated thickness of the film another thickness of adhesive coated film is contacted to the first thickness which has the grid in place. The material is rolled and produces a laminate, part of a typical sheet 23 which is shown in FIG. 4.

FIG. 3 is an enlarged cross section through a filament to show the various layers of the laminate. Filament 15 is in the adhesive layer 16 between two facing films 17 and 18. The facing film layers 17 and 18 have middle layers 19 and 20, respectively. On either side of the middle layer 19 are the outer thinner linear low density polyethylene layers 21a and 21b. The pressure sensitive adhesive was coated on layer 21b. Similarly middle layer 20 has outer layers 22a and 22b on either side. The pressure sensitive adhesive was coated on layer 22a. The filament diamond grid could be laid on layer 21b or layer 22a which are both coated with adhesive.

The reinforced film laminate of the invention gives a material which can be used as a protective covering or packaging which resists tears and punctures as well as abrasions caused by sharp corners of materials or irregularly shaped equipment. The total thickness of a typical final laminate with two layers of film about 2.0 mil each and a layer of adhesive with the diamond grid in the middle is about 4.5 mil. The weight of this material is extremely light at about 22.75 pounds per 1000 square feet. A typical 12 foot by 20 foot tarp weighs only about 5.5 pounds. The material is much easier to handle by personnel due to the lightweight. A heavier canvas material is more expensive and harder to handle. The reinforced laminate has an outdoor weathering time of at least 30 months. Other properties of a sample of 4.5 mil thickness with black color additive are shown in TABLE 1.

TABLE 1

| Property | |
|---|---|
| Tensile strength ASTM-D-882 | |
| machine direction | |
| lbs. | 63 ± 5 |
| psi | 4660 ± 370 |
| transverse direction | |
| lbs. | 55 ± 2 |
| psi | 4050 ± 150 |
| Elongation ASTM-D-882 | |
| machine direction (%) | 620 ± 50 |
| transverse direction (%) | 720 ± 50 |
| Impact strength | |
| Drop Dart ASTM-1709 Method B (grams) | 650 |
| Mullen Burst (grams) | 86 |
| PPT Tear ASTM-D-2582 | |
| Machine direction (lbs.) | 13.5 |
| Transverse direction (lbs) | 15.2 |
| Tongue Tear ASTM-D-2761 | |
| Machine direction (lbs.) | 16.5 ± 1.0 |
| Transverse direction (lbs) | 11.0 ± 1.0 |
| Shrinkage - 3 hours at 72° C. | |
| Area (%) | 1.96 |
| Machine direction (%) | 2.87 |
| Transverse direction (%) | −0.93 |
| Cold Crack ASTM-D-1709 (modified) | −18° C. to −23° C. |
| One Inch Reel (ounces) | 28.8 |
| Fiber pullout (lbs) | 5.3 |

In addition to the packaging and protective covering products, the material is also suitable for tubing for delivery of air in the form of duct work for buildings or mines. The material is suitable for aeration tubes for commercial fisheries.

EXAMPLE 1

A reinforced laminate was produced by first making a tri-extruded blown film of three layers. The middle layer is composed of a mixture of polyolefins which are by weight of the middle layer linear low density polyethylene film grade about 18%, high density polyethylene co-extrusion resin about 28.5%, polypropylene co-extrusion resin about 40%, ethylene-propylene-diene rubber about 10% and black film grade carbon black concentrate in linear low density polyethylene about 3.5%.

This color additive gives a black final product. The color additive is manufactured by Ampacet Corporation, U.S. Industrial, Inc. and others. It is a carbon black additive suitable for polyolefins and readily available commercially. The ethylene-propylene-diene rubber is commercially available from DuPont under the family trade name Nordel. The Nordel ethylene-propylene-diene rubber preferred for this embodiment are those with a Mooney viscosity of about 40 to about 70 and melt flow at 230° F. with a 2.16 kg weight from about 0.15 g/10 minutes to about 0.25 g/10 minutes and with a 10 kg weight from about 2.0 g/10 minutes to about 2.4 g/10 minutes. Other commercially available equivalents may be used.

Two outer layers co-extruded on either side of the middle layer and are composed of about 98.0% linear low density polyethylene film grade and about 2% ultraviolet stabilizer concentrate. The ultraviolet stabilizer concentrate is prepared by blending the stabilizer in polyethylene. The concentrate normally contains about 10% by weight of ultraviolet stabilizer. The concentrate is added such that it accounts for 2% by weight of the total formulation. The ultraviolet stabilizer is from a family of hindered amines. A preferred commercially available ultraviolet stabilizer is Chimassorb 944, a trade mark of Ciba-Geigy. The middle layer accounts for about 80% of the total film while the outer layers are about 10% each. Two thicknesses of the three layer film are coated on one side with a pressure sensitive, flexible adhesive. The adhesive is coated in about two ounces for ten square feet of film. On one thickness coated with the adhesive a nylon multifilament 460 denier with a Z twist is laid out in a diamond pattern grid. The grid is formed by filaments in two substantially parallel sets laid at 45° angles to either side of the machine axis. The strands are laid out and spaced about 0.5 inches apart. The two thicknesses of the film with the adhesive and reinforcing grid in between are passed between pressure rollers to form the laminate.

EXAMPLE 2

A clear reinforced laminate is produced by making an extruded blown film of the following described three layers. The middle layer is composed of about 40% polypropylene co-extrusion resin, about 28.5% high density polyethylene co-extrusion resin, about 18% linear low density polyethylene film grade, about 10% ethylene-propylene-diene rubber of the type previously described in Example 1 and about 3.5% ultraviolet stabilizer as described in Example 1. The two outer layers co-extruded on either side of the middle layer are composed of approximately 96.5% linear low density polyethylene film grade and about 3.5% the ultraviolet stabilizer as described in Example 1. The middle layer is about 80% of the total weight and thickness and the inner and outer layers are approximately 10% of the total weight and thickness. The total film thickness is 2.0±0.2 mils thick. The application of the adhesive and the nylon reinforcement diamond grid and laminating is as described in Example 1.

EXAMPLE 3

A reinforced laminate colored white is the composition of this example. A tri-extruded blown film is prepared of three layers. The middle layer is composed of 40% polypropylene co-extrusion resin, 28.5% high density polyethylene co-extrusion resin, about 7% linear low density polyethylene film grade, or about 10% ethylene-propylene-diene rubber of the type described in Example 1, about 3.5% ultraviolet stabilizer concentrate described in Example 1 and about 11% white color concentrate of titanium dioxide in low density polyethylene, which is commercially available from Ampacet Corporation and other sources. The two outer layers are composed of about 96.5% linear low density polyethylene and about 3.5% ultraviolet stabilizer concentrate described in Example 1. The middle layer is about 80% of the total weight and thickness and the inner and outer layers are approximately 10% of the total weight and thickness. The total film thickness is 2.0±0.2 mils thick. The application of the adhesive and the nylon reinforcement diamond grid and laminating is as described in Example 1.

EXAMPLE 4

This example is of a fire retardant reinforced laminate that contains particular additives to give the desired properties. A tri-extruded blown film of three layers is prepared with a middle layer of about 37% polypropylene co-extrusion resin, about 26% high density polyethylene co-extrusion resin, about 9.5% ethylene-propylene-diene rubber of the type described in Example 1, about 3.5% ultraviolet stabilizer concentrate described in Example 1 and about 24% fire retardant extrusion coating Product Number 11371 by Ampacet Corporation. The fire retardant additive is a proprietary formula of Ampacet Corporation and is used in polyolefins. The composition includes effective amounts of antimony trioxide and organic bromide and is contained in a linear low density polyethylene masterbatch. The outer layers of the tri-extruded film are about 96.5% linear low density polyethylene film grade and about 3.5% ultraviolet stabilizer concentrate described in Example 1. The fire retardant materials affect the ultraviolet stabilizer such that the outdoor weathering of the material is decreased to about six months. The rest of the properties on toughness, strength and stiffness are essentially unchanged. The further preparation of the laminated product and filament reinforcing is the same as Example 1.

What is claimed is:

1. A reinforced laminate film comprising
two thicknesses of co-extruded three ply film of a first film laminae and a second film laminae,
nonwoven reinforcing filament laid out in a diamond grid,
said nonwoven reinforcing filament grid is held between said first and said second film laminae by a pressure sensitive flexible adhesive layer which bonds said first and said second film laminae together,
said co-exteuded three-ply film has two outer layers of linear low density polyethylene, and
said co-extruded three-ply film has a middle layer that is by weight of said middle layer about 10% to about 25% linear low density polyethylene, about 14% to about 35% high density polyethylene, about 20% to about 50% polypropylene and about 5% to about 15% ethylene-propylene-diene rubber.

2. A reinforced laminate of claim 1 wherein at least one of said outer layers of said three-ply film have an effective amount of ultraviolet light stabilizer.

3. A reinforced laminate of claim 1 wherein said middle layer of said three-ply film has an effective amount of ultraviolet light stabilizer.

4. A reinforced laminate of claim 1 wherein said middle layer of said three-ply film contains a color additive.

5. A reinforced laminate of claim 1 wherein at least one outer layer of said three-ply film contains a color additive.

6. A reinforced laminate of claim 1 wherein said nonwoven reinforcing filament is nylon multifilament.

7. A reinforced laminate of claim 1 wherein said three-ply film comprises a middle layer of about 60% to 90% by weight of the total film and the two outer layers together comprise about 10% to about 40% of the total film weight.

8. A reinforced laminate of claim 1 wherein said three-ply film has a middle layer with an effective amount of a fire retardant.

9. A black reinforced laminate comprising;

two thicknesses of co-extruded three-ply film of a first film laminae and a second film laminae, reinforcing multifilament with a Z twist laid out in a diamond grid, said reinforcing nylon multifilament grid is held by a pressure sensitive flexible adhesive layer coated in about two ounces for ten square feet of film, said co-extruded three-ply film having two outer layers of linear low density polyethylene with ultraviolet stabilizer, said co-extruded three-ply film having a middle layer made up by weight of about 18% linear low density polyethylene, about 28.5% high density polyethylene, about 40% polypropylene, about 10% ethylene-propylene-diene rubber and about 3.5% linear low density polyethylene with carbon black additive, and said middle layer is about 80% of the total film weight and the outer layers are about 10% each of the total film weight.

10. A clear reinforced laminate comprising;

two thicknesses of co-extruded three-ply film of a first film laminae and a second film laminae, nonwoven reinforcing filament laid out in a diamond grid, said nonwoven reinforcing filament grid is held between said first and said second film laminae by a pressure sensitive flexible adhesive layer which bonds said first and second film laminae together, said co-extruded three-ply film has two outer layers of linear low density polyethylene with an ultraviolet light stabilizer, said co-extruded three-ply film having a middle layer made up by weight of about 40% polypropylene, about 28.5% high density polyethylene, about 18% linear low density polyethylene, about 3.5% linear low density polyethylene with an ultraviolet light stabilizer, and about 10% ethylene-propylene-diene rubber, and said total film thickness is about 2.0±0.2 mils thick.

11. A white reinforced laminate comprising;

two thicknesses of co-extruded three-ply film of a first film laminae and a second film laminae, nonwoven reinforcing filament laid out in a diamond grid, said nonwoven reinforcing filament grid is held between said first and said second film laminae by a pressure sensitive flexible adhesive layer which bonds said first and second film laminae together, said co-extruded three-ply film has two outer layers of linear low density polyethylene with an ultraviolet light stabilizer, said co-extruded three-ply film having a middle layer made up by weight of about 40% polypropylene, about 28.5% high density polyethylene, about 7% linear low density polyethylene, about 10% ethylene-propylene-diene rubber, about 3.5% linear low density polyethylene with ultraviolet stabilizer, and about 11% low density polyethylene with titanium dioxide concentrate, and said total film thickness is about 2.0±0.2 mils thick.

12. A fire retardant reinforced laminate comprising;

two thicknesses of co-extruded three-ply film of a first film laminae and a second film laminae, nonwoven reinforcing filament laid out in a diamond grid, said nonwoven reinforcing filament grid is held between said first and said second film laminae by a pressure sensitive flexible adhesive layer which bonds said first and second film laminae together, said co-extruded three-ply film has two outer layers of linear low density polyethylene with an ultraviolet light stabilizer, and said co-extruded three-ply film having a middle layer made up by weight of about 37% polypropylene, about 26% high density polyethylene, about 9.5% ethylene-propylene-diene rubber, about 3.5% linear low density polyethylene with an ultraviolet light stabilizer, and about 24% fire retardant additive of antimony trioxide, organic bromide in a linear low density polyethylene.

* * * * *